(12) United States Patent
Hars

(10) Patent No.: US 9,928,385 B2
(45) Date of Patent: Mar. 27, 2018

(54) PERIODIC MEMORY REFRESH IN A SECURE COMPUTING SYSTEM

(71) Applicant: The Boeing Company, Huntington Beach, CA (US)

(72) Inventor: Laszlo Hars, Lafayette, CO (US)

(73) Assignee: THE BOEING COMPANY, Chicago, IL (US)

( * ) Notice: Subject to any disclaimer, the term of this patent is extended or adjusted under 35 U.S.C. 154(b) by 235 days.

(21) Appl. No.: 14/472,948

(22) Filed: Aug. 29, 2014

(65) Prior Publication Data

US 2016/0063279 A1 Mar. 3, 2016

(51) Int. Cl.
| | |
|---|---|
| *G06F 12/14* | (2006.01) |
| *G06F 21/64* | (2013.01) |
| *G06F 21/00* | (2013.01) |
| *H04L 9/00* | (2006.01) |
| *G06F 21/78* | (2013.01) |

(52) U.S. Cl.
CPC .......... *G06F 21/64* (2013.01); *G06F 12/1408* (2013.01); *G06F 12/1425* (2013.01); *G06F 21/00* (2013.01); *G06F 21/78* (2013.01); *H04L 9/00* (2013.01)

(58) Field of Classification Search
CPC ....................................................... G06F 21/64
See application file for complete search history.

(56) References Cited

U.S. PATENT DOCUMENTS

| | | |
|---|---|---|
| 7,093,137 B1 | 8/2006 | Sato et al. |
| 7,469,344 B2 | 12/2008 | Folmsbee |
| 7,802,108 B1 | 9/2010 | Master et al. |
| 7,894,599 B2 | 2/2011 | Rigler |
| 7,937,595 B1 | 5/2011 | Kumar et al. |
| 8,370,645 B2 | 2/2013 | Asnaashari |
| 8,504,849 B2 | 8/2013 | Jogand-Coulomb et al. |
| 2009/0048976 A1* | 2/2009 | Hars ................ G11B 20/00086 705/50 |
| 2009/0100272 A1* | 4/2009 | Smeets ................ G06F 21/121 713/189 |
| 2009/0187771 A1 | 7/2009 | McLellan, Jr. |

(Continued)

OTHER PUBLICATIONS

Yan, Chenyu, et al. "Improving cost, performance, and security of memory encryption and authentication." ACM SIGARCH Computer Architecture News. vol. 34. No. 2. IEEE Computer Society, 2006.*

(Continued)

*Primary Examiner* — Mahfuzur Rahman
*Assistant Examiner* — Michael Guirguis
(74) *Attorney, Agent, or Firm* — Womble Bond Dickinson (US) LLP

(57) ABSTRACT

A method of providing security in a computer system includes performing a memory refresh of a window of memory locations in a memory, and in which each memory location stores a version value and a block of ciphertext. The version value may be updated with each write operation at a memory location; and the block of ciphertext may be produced with a key that changes with each write operation and from memory location to memory location. The memory refresh may include performing a periodic read operation followed by a corresponding write operation at each memory location. Between the read and write operations, the version value stored at the memory location may be compared with a chronologically earliest version value stored at any memory location of the window, and validity of the block of ciphertext stored at the memory location may be verified based on the comparison.

16 Claims, 3 Drawing Sheets

(56) References Cited

U.S. PATENT DOCUMENTS

| | | | | |
|---|---|---|---|---|
| 2011/0145598 A1* | 6/2011 | Smith | ............... | G06F 21/554 |
| | | | | 713/190 |
| 2012/0042380 A1* | 2/2012 | Kohiyama | ............ | G06F 21/10 |
| | | | | 726/22 |
| 2013/0117577 A1* | 5/2013 | Hars | ............... | G06F 12/1408 |
| | | | | 713/190 |
| 2014/0208109 A1* | 7/2014 | Narendra Trivedi | . | H04L 9/0643 |
| | | | | 713/170 |

OTHER PUBLICATIONS

Al-Hazaimeh, "Design of a New Block Cipher Algorithm," IISTE, Network and Complex Systems, vol. 3, No. 8, 2013, 7 pages.

Beaulieu et al., "The Simon and Speck Families of Lightweight Block Ciphers," NSA, Jun. 2013, 45 pages.

Bogdanov et al., "PRESENT: An Ultra-Lightweight Block Cipher," Cryptographic Hardware and Embedded Systems—CHES 2007, Lecture Notes in Computer Science, vol. 4727, 2007, pp. 450-466.

Hars et al., "Pseudorandom recursions II," EURASIP Journal on Embedded Systems, 2012, 11 pages.

Knudsen et al., "PRINTcipher: A Block Cipher for IC-Printing," Cryptographic Hardware and Embedded Systems, CHES 2010, Lecture Notes in Computer Science, vol. 6225, Aug. 2010, 15 pages.

"Feistel cipher," 2014, Wikipedia article—http://en.wikipedia.org/w/index.php?title=Feistel_cipher&oldid=591294982 [May 27, 2014], 6 pages.

"Linear feedback shift register," 2014, Wikipedia article—http://en.wikipedia.org/w/index.php?title=Linear_feedback_shift_register&oldid=609519852 [May 27, 2014], 10 pages.

"Power analysis," 2014, Wikipedia article—http://en.wikipedia.org/w/index.php?title=Power_analysis&oldid=609430707 [May 27, 2014] 4 pages.

European Search Report dated Dec. 4, 2015 for Application No. 15182140.2.

* cited by examiner

PERIODIC MEMORY REFRESH IN A SECURE COMPUTING SYSTEM

CROSS-REFERENCE TO RELATED APPLICATION(S)

The present application is related to U.S. patent application Ser. No. 13/722,871, entitled: Secure Memory Transaction Unit, filed on Dec. 20, 2012, which is a continuation-in-part of and claims priority to U.S. patent application Ser. No. 13/341,630, entitled: Infinite Key Memory Transaction Unit, filed on Dec. 30, 2011, which in turn claims priority to U.S. Provisional Patent Application No. 61/505,039, entitled: Secure Server for Configuring and Programming Secure Microprocessors and Infinite Key Memory Transaction Unit, filed on Jul. 6, 2011. The contents of all of the aforementioned are incorporated herein by reference in their entireties.

TECHNOLOGICAL FIELD

The present disclosure relates generally to the protection of data in a computer system and, in particular, to the protection of data stored in memory in a computer system, which data is often transferred on one or more buses therein.

BACKGROUND

To provide for secure communications and protection of financial, military, medical or other data requiring a high degree of protection, computer and microprocessor-based systems now implement various security measures. These measures are generally intended to preclude an adversary's illicit access to data stored in a memory being accessed by the microprocessor, for example, because the memory and microprocessor are on the same circuit board and/or coupled by a bus.

Common types of attacks on such processors can be categorized as active or passive attacks. In passive attacks an adversary reads the contents of the memory, in the hope to discover secrets, like passwords, copyrighted material, etc. A passive attacker can also monitor the data traffic between the processor and the memory (or some peripherals) for secrets.

Active attacks attempt to modify the contents of the memory, or the data traffic between the memory and the processor. Active attacks include attempts to copy-and-paste memory blocks between different locations, or playing back earlier content of the same, or another location. Such attacks can cause harm, for example by creating an infinite loop, or otherwise impact the program. In a known data recognition attack, an adversary may attempt to learn an encryption key by watching writes of known data to the same address.

It may therefore be desirable to have a system and method that addresses these challenges, and improves upon existing practices.

BRIEF SUMMARY

A technique has been developed to address malicious attempts to copy-and-paste memory blocks between different locations. This technique involves memory address-dependent encryption and address-dependent data authentication, which can be implemented by a "tweakable" cipher, where part of the key (the tweak value) may depend on the memory location. However, common block-ciphers like the Advanced Encryption Standard (AES) cipher in simple encryption modes such as ECB (electronic code book) or counter mode may also be used with the same security, if the encryption—and authentication key—changes with the memory location.

While this technique may address copy-and-paste attacks, it may leave other attacks such as malicious memory replay attacks unaddressed. In various instances, these attacks may involve resetting a computing system to an earlier state when users or some software agents were authenticated and/or authorized for certain actions, which may permit an adversary to undo logoff or timeout conditions and thereby illicitly extend the authentication/authorization. In other instances, an adversary may undo transactions (e.g., electronic banking, commerce) or reset event counters, and may thereby cause improper behavior of the system. And in yet other instances, an adversary may falsify logs, records or force repeating (now illegal) actions of the computing system.

In view of the foregoing, example implementations of the present disclosure include a system and method for providing security in a computer system, and in particular a system and method for preventing memory replay attacks. Example implementations provide a background task that performs a memory refresh by periodically rewriting the memory. During this memory refresh, example implementations keep track of the age of valid stored data. A memory replay attack may attempt to bring back older data, and may be easily invalidated by its age and thereby detected by the system. In such instances, one or more appropriate actions for a replay attack may be performed to ensure integrity of the computer system.

According to one aspect of example implementations, a method of providing security in a computer system includes performing a memory refresh of a window of memory locations in a memory, in which each memory location may store a version value and a block of ciphertext. The version value may be updated with each write operation at a memory location, and the block of ciphertext may be produced with a key that depends on the version value and thereby changes with each write operation. The key may also change from memory location to memory location.

The memory refresh may include periodically rewriting each memory location, including performing a periodic read operation followed by a corresponding write operation at each memory location. And between the read operation and corresponding write operation at each memory location, the memory refresh may include comparing the version value stored at the memory location with a chronologically earliest version value stored at any memory location of the window. And validity of the block of ciphertext stored at the memory location may be verified based on the comparison. Here, the validity of the block of ciphertext may be verified in an instance in which the version value stored at the memory location is no earlier than the earliest version value.

In some examples, the read operation at each memory location includes reading the version value and block of ciphertext stored at the memory location having a respective address. In these examples, the key may be regenerated using the version value and respective address, and the block of ciphertext may be decrypted with the regenerated key to produce plaintext corresponding to the block of ciphertext. In further examples, then, the write operation may include updating the version value, and generating another key using the updated version value and respective address. The plaintext may be encrypted with the generated key to reproduce the block of ciphertext, and the updated version value and reproduced block of ciphertext may be written at the memory location having the respective address.

In some examples, each memory location may further store a data authentication tag produced with a second key that changes with each write operation. The second key may also change from memory location to memory location. In these examples, the read operation may include verifying integrity of the ciphertext based on the data authentication tag and second key.

In some examples, the memory refresh may be performed in cycles in each of which the read operation and corresponding write operation are performed sequentially over the memory locations of the window. In other examples, the read operation and corresponding write operation in each cycle may be performed randomly (randomly or pseudo-randomly) over the memory locations of the window.

In some examples, the read operation and corresponding write operation in each cycle may be performed over the memory locations of the window. And in each cycle, an additional read operation and corresponding write operation may be performed at each of one or more randomly-selected memory locations of the window.

Regardless of the manner in which the memory locations are rewritten in at least one instance in which the validity of the block of ciphertext is not verified, the method may further include performing one or more actions in accordance with one or more security policies.

In another aspect of example implementations, a system is included for providing security in a computer system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
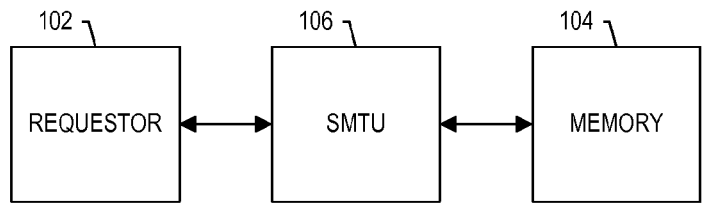
FIG. 1 is an illustration of a system in accordance with example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Furthermore, it should be understood that unless otherwise specified, the terms "data," "content," "information," and similar terms may be at times used interchangeably. Like reference numerals refer to like elements throughout.

Referring now to FIG. 1, a system 100 is illustrated according to example implementations of the present disclosure. The system may include one or more of each of a number of components, units or the like (generally "components") at least some of which may be composed of logic circuits such as multiplexers, registers, arithmetic logic units, memory, microprocessors and the like. The system may be designed for any of a number of different applications, and may have particular applicability in systems including or coupled to memory susceptible to attacks, such as in-flight computers, military and space programs, corporate network, personal and laptop computers, smart mobile devices. As shown, for example, the system may include one or more components referred to herein as requestors 102 configured to initiate or otherwise request read and/or write transactions (at times referred to as operations) with one or more memories 104, which in some examples may occur on one or more buses between them.

In accordance with example implementations, the system 100 may further include one or more components referred to herein as secure memory transaction units (SMTUs) 106 configured to encrypt and decrypt data transfers between a requestor 102 and memory 104, and may be used in at least some if not all read or write transactions with the memory. And as described below, in some but perhaps not all examples, the SMTUs may also be configured to authenticate the contents of the memory. In various examples, the SMTU design may be memory agnostic in that the type and location of the memory (internal or external) may be "unknown" to the SMTU.

The SMTU 106 may provide, with very high probability, a different encryption key for every location in the memory 104. In some examples, the SMTU may use standard encryption algorithms as ciphers, such as a combination of standard operation modes of the Advanced Encryption Standard (AES) cipher, for encryption and authentication of the contents of the memory. Each amount (e.g., 16 bytes) of plaintext data (sometimes simply referred to as plaintext or data) to be stored at a respective memory location at least within a window of memory locations may be encrypted with a unique encryption key and tagged with a version value and data authentication tag, which may be stored at the memory location with the encrypted data (at times referred to as ciphertext).

In some examples, the version value may be derived from a global write counter (GWC) (e.g., 48-bit value) that indicates the number of encrypted write operations that have taken place such as in a current computing session. In other examples, the version value may be derived using the number of write operations over multiple computing sessions, a time stamp or the like. Or in yet other examples, the version value may be derived from a clock.

In some examples, the GWC may be reset at the beginning of every session of secure operation. The GWC values may be stored in-the-clear or encrypted with the user data, and modified by a secret mask value before use as part of the key generation. The GWC value may be incremented before any write operation by an increment value, which may be sized similar to the GWC (e.g. 48-bit value). This increment value may be a large odd value that does not have many consecutive 1's or 0's in its binary representation. Examples of suitable increment values are segments of the bit sequences of π, e, √2, √3, the golden ratio, etc. Use of values such as these may assure that consecutive GWC values differ in about half the bits, in the average. Use of an odd GWC increment value may assure that the GWC will not wrap around in typical applications for more than ten years of continuous operation.

The data authentication tag at a memory location may depend on the ciphertext at that memory location, and in a manner that is cryptographically secure in that an adversary cannot create a valid data authentication tag, nor may the adversary be able to deduce any information about the ciphertext from the data authentication tag. In some examples, the data authentication tag may serve as a message authentication code, a short piece of information used to authenticate the ciphertext, and to detect data tampering and forgery. The tag may protect both the ciphertext's integrity as well as its authenticity, by allowing detection of any changes to it. In some examples, the tag may be implemented by a block cipher, that is, an algorithm that operates on the ciphertext to perform a transformation specified by a key.

The ciphertext and data authentication tag at a memory location may be produced with keys based on at least the version value and address of the memory location. The version value may be updated with each write operation at a memory location, and the key with which the ciphertext is produced may thereby change with each write operation. The key may also change from memory location to memory location. The data authentication tag may be produced with a second key different from the key that produced the block of ciphertext; but like that key, the second key may change with each write operation and from memory location to memory location. In some examples, a secret random number and other values, such as a security mode value, may be incorporated to further diversify the encryption and authentication. As described herein, the term random may be used broadly to refer to either random or pseudorandom.

During read transactions in which the requestor 102 has requested data from the memory, the SMTU may read previously-encrypted data (ciphertext) from the memory. The encrypted data may be decrypted and authenticated by the SMTU against signs of tampering; and the SMTU may return the decrypted data (plaintext) to the requestor in instances in which the data is considered valid. In write transactions, the SMTU may read the data at a target location, then decrypt and authenticate that data just as with a read access. Once this is complete, the SMTU may cause the data to be written to be merged with the data read from the location, encrypted, and then written back to the memory. As used here, merged means to replace the portion of the data read back that has changed. If desired, a different approach can be used when a complete block of ciphertext is to be written. In these instances, the merge operation may become a replacement, and the initial read operation may be omitted, trading security for speed.

In various examples, a method for providing security for read data being transferred between, or within, units in the system 100 may include dividing the memory 104 into a series of addressable locations (the memory thereby being an addressable memory), each having an address and each storing encrypted data, a version value (sometimes referred to as version information) and a data authentication tag. As described herein, an addressable location of the memory may at times be varyingly but equally referred to as an address, a location or an addressable location. A unique encryption key for the encrypted data, and a different, unique authentication key for the data authentication tag, may be used for each address. These keys may be unpredictable to an adversary, and kept secret before, during and after they are used.

In each read operation, the version value, data authentication tag and a block of ciphertext may be read at a memory location having a respective address. The respective keys with which the ciphertext and data authentication tag were produced may be regenerated using the version value and respective address. The ciphertext may be decrypted with its key to produce its corresponding plaintext. And using the second key for the data authentication tag, the ciphertext may be compared with the data authentication tag to verify its integrity and authenticity.

In each write operation, new plaintext data may be written to a memory location in memory 104. In some examples, each write operation may be preceded by a data read at the location and verification of the data by the SMTU 106 as valid. The process of writing data to the memory location may include the SMTU updating the version value such as to reflect a new number of memory write operations made. The SMTU may then generate another key for encryption of the new data using the updated version value and respective address of the memory location (and perhaps a random number and/or some other values), and the SMTU may generate a new second key for production of a new data authentication tag that depends on the encrypted new data.

In a further aspect of example implementations of the present disclosure, the requestor 102 and SMTU 106 may be configured to implement a memory refresh to protect against memory replay attacks. As explained above, these attacks may involve an adversary attempting to save the content of one or more memory locations and restore this saved data later, and which if left unaddressed, may cause harmful behavior of the system and even lead to loss of secrets. In accordance with this aspect, then, the requestor may be configured to implement a background task that periodically (at regular intervals) rewrites a window of memory locations in the memory 104. This may include the requestor and SMTU being configured to perform a periodic read operation followed by a corresponding write operation at each memory location. The SMTU may keep track of the age of valid stored data such that a memory replay attack that brings back old data may be invalidated by the SMTU based on its age, and may thereby be easily detected. The SMTU may then take appropriate actions to ensure the integrity of the system.

More particularly, for example, between the read operation and corresponding write operation at each memory location of the memory 104, the SMTU 106 may be configured to compare the version value stored at the memory location with a chronologically earliest version value stored at any memory location of the window. The SMTU may then be configured to verify validity of the block of ciphertext stored at the memory location based on the comparison, in an instance in which the version value stored at the memory location is no earlier than the earliest version value. In some examples, this earliest version value may be maintained for the window as the oldest version value stored at any of the window's memory locations, and which may be updated as the oldest data in the window is refreshed. The validity of the block of ciphertext, then, may be verified in an instance in which its version value is no older than the oldest version value stored at any of the window's memory locations; otherwise, in an instance in which the version value is older, a data replay may be detected.

The memory refresh may be performed in cycles in which each of the memory locations in the window of the memory 104 may be rewritten at least once. The order in which the memory locations are rewritten in each cycle may be selected in any of a number of different manners. In some examples, the SMTU 106 may be configured to rewrite the memory locations sequentially over the window. In other examples, the SMTU may be configured to rewrite the memory locations randomly (randomly or pseudorandomly) over the window, with the random sequence perhaps changing with each cycle. This may be slower than sequentially rewriting the memory locations, but it may also be more secure. That is, it may hide the memory refresh structure such that an attacker will not know, where and when the refresh will next operate in the memory. And in some further examples, a cycle may include multiple rewrites of one or more randomly-selected memory locations, which may further obfuscate the refresh order, and may make normal requested read operations indistinguishable from refresh read operations.

In at least one instance in which the validity of the block of ciphertext is not verified, the SMTU 106 may be further configured to perform one or more actions in accordance with one or more security policies. These actions may include actions the same or similar to those that may be performed by the SMTU in instances in which the authentication of the data based on the data authentication tag fails, as described below.

Figure 2:
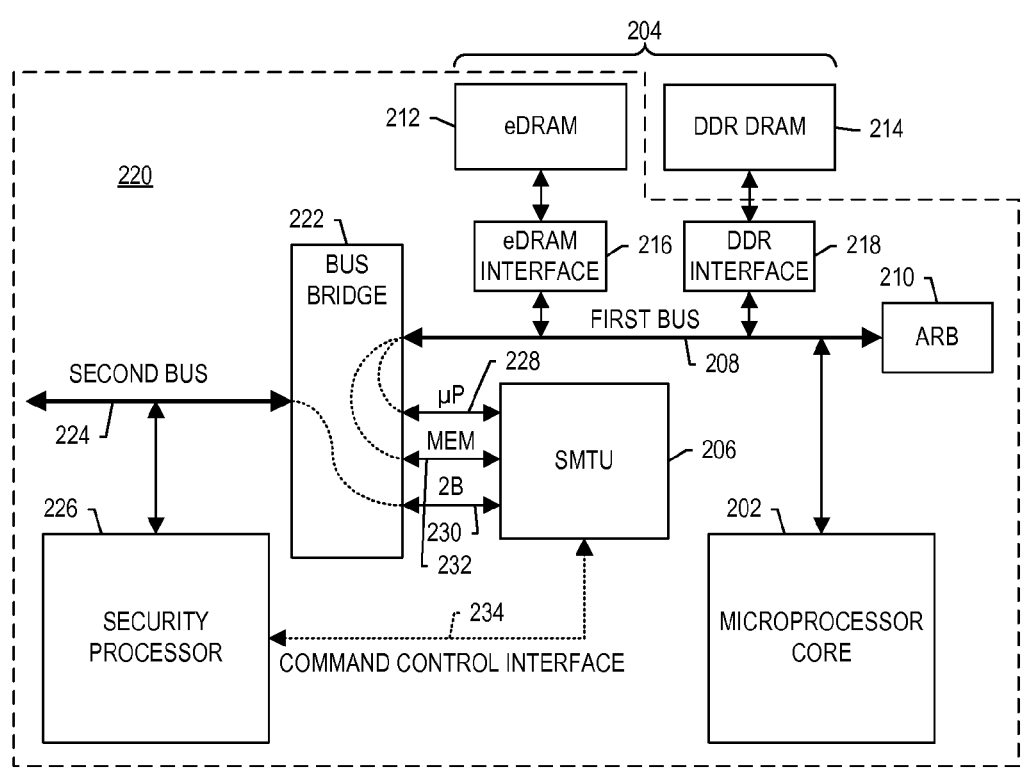
FIG. 2 is an illustration of a system that in some examples may correspond to the system of FIG. 1.

FIG. 2 illustrates one example of a system 200 that in some examples may correspond to the system 100 of FIG. 1. The system may be constructed in accordance with any of a number of different approaches. In some examples, the system may be constructed according to a system-on-chip (SoC) approach in which the components of a system are integrated into a single integrated circuit (IC) (sometimes referred to as a "chip"). In a more particular example, the system may be constructed according to the CoreConnect microprocessor bus-architecture from IBM Corporation. As described herein, various components of the system or functions of components of the system may be described in the nomenclature of a particular technology such as SoC or even CoreConnect. It should be understood that any specific nomenclature used herein is merely for purposes of illustration, and should not be taken to limit the scope of example implementations of the present disclosure.

Similar to the system 100 of FIG. 1, the system 200 of FIG. 2 may include a number of components at least some of which may be composed of logic circuits. As shown, for example, the system may include a microprocessor core 202, memory 204 and SMTU 206, which in some examples may function as or correspond to the requestor 102, memory 104 and SMTU 106 of FIG. 1. Although not shown, it should be understood that the system may include other components that may at times be configured to function as a requestor, which again may be a component configured to initiate or otherwise request read and/or write transactions with memory.

As shown in FIG. 2, the microprocessor core 202 may be directly or indirectly coupled to a first bus 208 along with the memory 204, SMTU 206 and other components, and use of the first bus may be allocated by an arbitration circuit 210. In one example, the microprocessor core may be a PowerPC core commercially available from IBM Corporation, and the first bus may be a processor local bus (PLB). Examples of suitable memory include embedded dynamic access memory (eDRAM) 212, double data rate synchronous (or other) dynamic random access memory (DDR DRAM) 214 or the like, some of which may be coupled to the first bus by respective memory controls or interfaces 216, 218. In some examples in which the system is constructed as a SoC with various components integrated into a single integrated circuit 220, the memory may be off-chip (external) from other components of the system, and may be coupled to the first bus by an on-chip (internal) memory control. This is illustrated, for example, by the DDR DRAM in FIG. 2.

The components coupled to the first bus 208 may also include a bus bridge 222 between the first bus and another, second bus 224 such as a transaction bus to which additional components may be coupled, such as a security processor 226 and perhaps components that may at times function as requestors. In some examples, the first bus may be a high-speed bus with high-performance components coupled thereto, and the second bus may be a low-speed bus. In these examples, the bus bridge may serve to separate the high-performance components from the low-performance components, which may in turn improve system performance.

The SMTU 206 may be configured to encrypt and decrypt data transfers between requestors such as the microprocessor core 202 and either or both of the eDRAM 210 or DDR DRAM 212. The SMTU may act as a slave unit serving read and write requests initiated by the microprocessor core or another requestor, where the SMTU may initiate the read or write as requested from a particular memory address. The SMTU may thereby provide a high level of security for these transactions.

The SMTU 206 may be coupled in the system 200 in any of a number of different manners. As shown, for example, the SMTU may be coupled to the bus bridge 220 by three bidirectional external data interfaces, and may be coupled to the security processor 226 by another bidirectional external data interface. That is, the SMTU may be coupled to the bus bridge by a microprocessor-core interface 228, a second-bus interface 230 and a memory interface 232, and coupled to the security processor by a command-and-control interface 234.

The microprocessor-core interface 228 may be coupled to the microprocessor core 202 via the first bus 208 to receive control information such as requests to read data from and/or write data to memory 204. The second-bus interface 230 may be coupled to the second bus 224, and the memory interface 232 may be coupled to the memory via the first bus. The bus bridge 220 may allow transactions over the microprocessor-core interface and memory interface be routed only to and from the first bus, and the transactions over the second-bus interface to be routed only to and from the second bus. The command-and-control interface 234, then, may enable the security processor 226 to provide command and control information to the SMTU through a separate interface.

Figure 3:
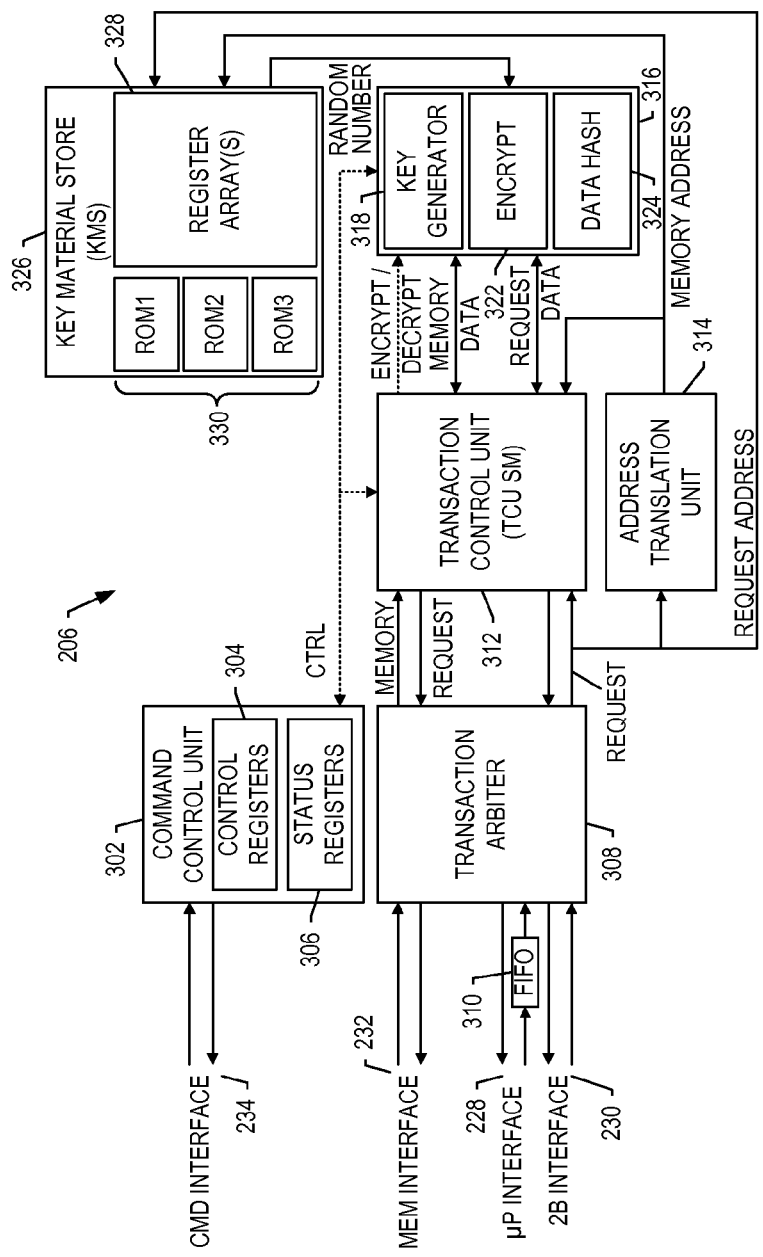
FIG. 3 is an illustration of a secure memory transaction unit, in accordance with example implementations.

FIG. 3 is a diagram illustrating various components of the SMTU 206 of FIG. 2, at least some of which, again, may be composed of logic circuits. As shown, the SMTU may include, and the command-and-control interface 234 may be coupled to, a command control unit 302 having control registers 304 and status registers 306. The SMTU may include a transaction arbiter 308 coupled to and configured to allocate use of the microprocessor-core interface 228, second-bus interface 230 and memory interface 232. A first-in first-out (FIFO) memory 310 on the microprocessor-core interface may be configured to buffer transactions to the arbiter.

The arbiter 308 may also be coupled to a transaction control unit 312 and an address translation unit 314, and the transaction control unit may be in turn coupled to a cryptography unit 316 that provides a key generator 318, encryption unit 320 and data-hashing unit 322. The cryptography unit may be coupled to a key material store (KMS) 326 configured to provide random numbers to the key generator to generate keys for the encryption unit and data-hashing unit. The encryption unit may be configured to encrypt and decrypt data for all read and write operations with an appropriate memory 204 in response to read or write requests invoking the SMTU 206. And the data-hashing unit may be configured to produce data authentication tags for encrypted data (ciphertext) read from and written to the memory. In some examples, the encryption unit may be configured to employ an AES cipher for encryption and decryption operations, and the data-hashing unit may be configured to employ a keyed hash function.

In some examples, the KMS 326 may include one or more register arrays 328 (sometimes referred to as KMS memories) configured to provide random numbers. Because the SMTU relies on random numbers provided by the KMS, the use of high quality random numbers is often desirable. In some examples, then, the KMS may include four 64×64 register arrays that provide 16K-bit random numbers. Prior to operation, the KMS unit may be initialized with 16K-bit random numbers, which in some examples may be generated outside of the SMTU.

As an alternative to using a true random number, in some examples, the KMS 326 may be initialized from one or more onboard configuration/entropy read-only memory blocks (ROMs) 330 such as 512×16 ROMs, three of which are shown as ROM1, ROM2 and ROM3. These ROMs may contain random numbers generated during system design. Using the configuration ROMs as the source of the random numbers may make the generated keys less random, therefore degrading the strength of the anti-tampering mechanism. However, there are applications in which using the ROMs as the random number sources may be desirable. One application is of a time critical application, in which long initialization delays that are associated with generation of the random number are not acceptable. Another type is an application that needs to generate an encrypted data image that can be restored following a system reset or an image that can be restored on a different system.

Further information regarding various features of the system 200 and SMTU 206 according to example implementations may be found below and in the aforementioned, related and incorporated '871 application.

Figure 4:
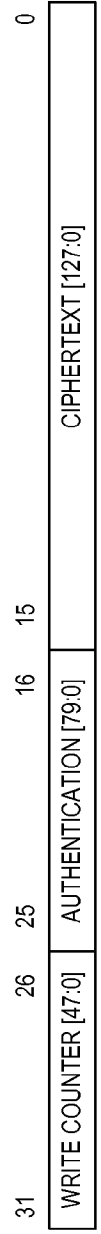
FIG. 4 illustrates the data structure of information stored in a memory location, in accordance with example implementations.

FIG. 4 illustrates the data structure for encrypted data stored in memory 104, 204, according to some example implementations of the present disclosure. As shown, encrypted data may be stored using 32-byte blocks each of which may include 16 bytes of encrypted payload (ciphertext), and 16 bytes of security data. The security data may include 6 bytes of version value (in the illustrated example, a write counter value), and 10 bytes of authentication tag. The 6-byte write counter is a field that may be incremented every time a memory location is written, regardless of the address. As a result, the incremented value is unique to each address. The encryption operation and the authentication key for a memory location may be derived from its address, and write counter value, and from a random number. In other examples, more or fewer fields may be used in the encryption. Because every 16 bytes of encrypted data require an additional 16 bytes for an authentication tag and write counter value, the effective data storage capacity of each window of memory locations may be one-half its physical size. But again, in other examples, larger or smaller memories and different data and tag sizes may be implemented.

Returning to FIGS. 2 and 3, the memory refresh of a memory location in the window of memory locations in the memory 204 according to example implementations may include the microprocessor core 202 generating a request for data at a memory location having a respective address, and providing that address to the memory 204 on the first bus 208. Of course, rather than receiving the address from the microprocessor core, the address may be provided from some other requestor such as a direct memory access controller.

The received address may also be provided to the SMTU 206. In some examples, the address may be a logical address, and may be translated by the address translation unit 314 to a physical address. The address may be provided through the transaction control unit 312 to the key generator 318, which may functionally include three key generators, at times referred to herein as key generators W, C and D configured to generate respective keys W, C and D. Each of the three key generators may also receive the random numbers earlier stored or generated in the KMS 326. Stored at the memory location is the write counter value (e.g., version value), data authentication tag and block of ciphertext, and this information may be provided to the transaction control unit. In some examples, the write counter value may be encrypted, and this encryption can be very simple, and its key can be a predefined constant, without significant loss of security.

The encryption unit 320 or another component of the SMTU 206 may decrypt the write counter value using key W. The encryption unit 320 may decrypt the ciphertext using key C, while the transaction control unit may employ the data-hashing unit 322 to verify the integrity of the ciphertext based on the ciphertext, key D and data authentication tag. Additionally, the transaction control unit may compare the write counter value with chronologically earliest write counter value stored at any memory location of the window, and from the comparison, the transaction control unit may verify the validity of the ciphertext. Assuming that the integrity of the ciphertext is verified, and the write counter value is no earlier than the earliest write counter value (ciphertext validity verified), the decrypted ciphertext (now plaintext) may be rewritten to the memory location. On the other hand, instances in which the ciphertext authenticity is not verified may signal an error.

In instances in which an error occurs, it may indicate that a random error or possible data tampering has occurred, and the transaction control unit 312 may perform any of a number of different actions in response. For example, the transaction control unit may cause the system 200 to (i) stop processing all read and write requests, (ii) delete the random number used for encryption in the current session, (iii) flush all registers that participated in key generation activities, (iv) trigger a memory flush to overwrite the content of the memory window with all zeros, or (v) take other action. In another example, the transaction control unit may maintain a fault counter, which may be incremented in response to an error. In this approach, if a threshold of the number of errors is reached, the transaction control unit may cause any one or more of the aforementioned actions. This approach may be useful in a noisy environment where random memory read errors occasionally occur.

Rewriting the decrypted ciphertext (plaintext) to the memory location in the memory 204 may include the transaction control unit 312 being configured to increment a GWC, and provide the updated value to each of key generators C and D of key generator 318. Using the incremented write counter value and the address of the memory location, key generators C and D may generate new keys C and D, and provide the keys to the encryption unit 320 and data-hashing unit 322, respectively. The encryption unit may use new key C to encrypt the plaintext to reproduce the ciphertext, and the data-hashing unit may use the reproduced ciphertext and key D to produce a new data authentication tag. The combination of key W and the incremented GWC value may be used to provide an encrypted write counter value. The resulting write counter value, data authentication tag and ciphertext may then be returned and written to the memory location. The process may then repeat for other memory locations in a cycle through the window, and then the cycle may repeat.

Figure 5:
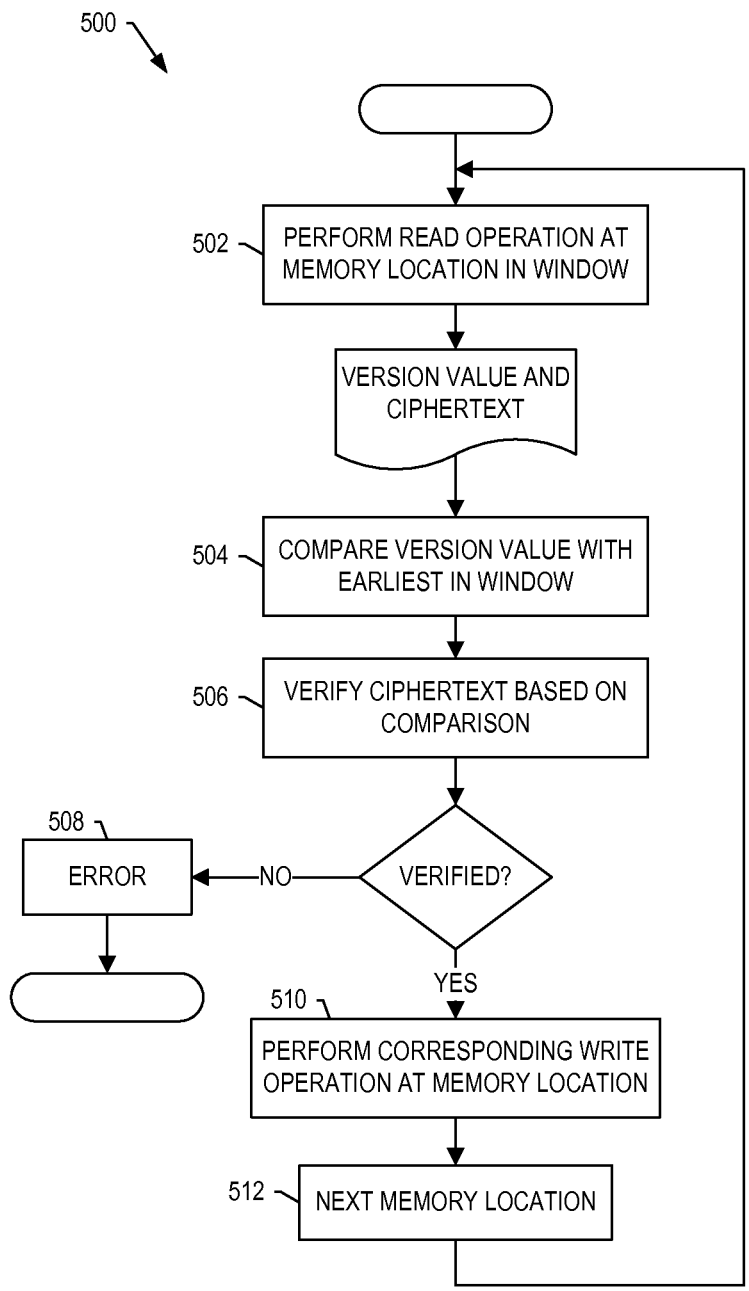
FIG. 5 illustrates a flowchart including various operations in a method according to example implementations of the present disclosure.

FIG. 5 illustrates various operations in a method of providing security in a computer system, according to example implementations of the present disclosure. As shown at block 500, the method may include performing a memory refresh of a window of memory locations in a memory, and in which each memory location stores a version value and a block of ciphertext. The version value may be updated with each write operation at a memory location. And the block of ciphertext may be produced with a key that depends on the version value and thereby changes with each write operation. The key may also change from memory location to memory location.

As shown at blocks 502 and 510, the memory refresh may include performing a periodic read operation followed by a corresponding write operation at each memory location. Between the read operation and corresponding write operation at each memory location, the memory refresh may include verifying validity of the ciphertext. That is, the memory refresh may include comparing the version value stored at the memory location with a chronologically earliest version value stored at any memory location of the window, and verifying validity of the block of ciphertext stored at the memory location based on the comparison, as shown in blocks 504 and 506. For this, the validity of the block of ciphertext may be verified in an instance in which the version value stored at the memory location is no earlier than the earliest version value. Instances in which the ciphertext validity is not verified may signal an error, as shown in block 508. Otherwise, the corresponding write operation may be performed, and the memory refresh may move to the next memory location in the window and repeat, as shown in blocks 510 and 512.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for providing security in a computer system, the system comprising one or more logic circuits configured to perform a memory refresh of a window of memory locations in a memory, including being configured to at least:

perform a periodic read operation followed by a corresponding write operation at each memory location, each memory location having a respective address storing a version value and a block of ciphertext, the version value being updated with each write operation at a memory location, and the block of ciphertext being produced with a key that depends on the version value and the respective address and thereby changes with each write operation, the key also changing from memory location to memory location; and between the read operation and corresponding write operation at each memory location;

compare the version value stored at the memory location with a chronologically earliest version value stored at any memory location of the window; and verify validity of the block of ciphertext stored at the memory location based on the comparison, the validity of the block of ciphertext being verified in an instance in which the version value stored at the memory location is no earlier than the earliest version value, wherein the version value stored at the memory location is updated with the corresponding write operation at the memory location, and includes the one or more logic circuits being configured to update the chronologically earliest version value only when the version value stored at the memory location is the chronologically earliest version value, the chronologically earliest version value being updated with the version value stored at the memory location.

2. The system of claim 1, wherein the one or more logic circuits are configured to perform the memory refresh in cycles in each of which the one or more logic circuits are configured to perform the read operation and corresponding write operation randomly over the memory locations of the window.

3. The system of claim 1, wherein the one or more logic circuits are configured to perform the memory refresh in cycles in each of which the one or more logic circuits are configured to perform the read operation and corresponding write operation randomly over the memory locations of the window.

4. The system of claim 1, wherein the one or more logic circuits are configured to perform the memory refresh in cycles in each of which the one or more logic circuits are configured to perform the read operation and corresponding write operation over the memory locations of the window, and in each of which the one or more logic circuits are configured to perform an additional read operation and corresponding write operation at each of one or more randomly-selected memory locations of the window.

5. The system of claim 1, wherein each memory location further stores a data authentication tag produced with a second key that changes with each write operation, the second key also changing from memory location to memory location, and wherein the one or more logic circuits being configured to perform the read operation includes being configured to at least verify integrity of the ciphertext based on the data authentication tag and second key.

6. The system of claim 1, wherein the one or more logic circuits being configured to perform the read operation at each memory location includes being configured to at least:
read the version value and block of ciphertext stored at the memory location having a respective address;
regenerate the key using the version value and respective address; and
decrypt the block of ciphertext with the regenerated key to produce plaintext corresponding to the block of ciphertext.

7. The system of claim 6, wherein the one or more logic circuits being configured to perform the corresponding write operation at each memory location includes being configured to at least:
update the version value;
generate another key using the updated version value and respective address;
encrypt the plaintext with the generated key to reproduce the block of ciphertext; and
write the updated version value and reproduced block of ciphertext at the memory location having the respective address.

8. The system of claim 1, wherein in at least one instance in which the validity of the block of ciphertext is not verified, the one or more logic circuits are further configured to at least:
perform one or more actions in accordance with one or more security policies.

9. A method of providing security in a computer system, the method comprising performing a memory refresh of a window of memory locations in a memory, the memory refresh comprising:
performing a periodic read operation followed by a corresponding write operation at each memory location, each memory location having a respective address storing a version value and
a block of ciphertext, the version value being updated with each write operation at a memory location, and the block of ciphertext being produced with a key that depends on the version value and the respective address and thereby changes with each write operation, the key also changing from memory location to memory location; and between the read operation and corresponding write operation at each memory location;
comparing the version value stored at the memory location with a chronologically earliest version value stored at any memory location of the window; and
verifying validity of the block of ciphertext stored at the memory location based on the comparison, the validity of the block of ciphertext being verified in an instance in which the version value stored at the memory location is no earlier than the earliest version value,
wherein the version value stored at the memory location is updated with the corresponding write operation at the memory location, and includes updating the chronologically earliest version value only when the version value stored at the memory location is the chronologically earliest version value, the chronologically earliest version value being updated with the version value stored at the memory location.

10. The method of claim 9, wherein the memory refresh is performed in cycles in each of which the read operation and corresponding write operation are performed sequentially over the memory locations of the window.

11. The method of claim 9, wherein the memory refresh is performed in cycles in each of which the read operation and corresponding write operation are performed randomly over the memory locations of the window.

12. The method of claim 9, wherein the memory refresh is performed in cycles in each of which the read operation and corresponding write operation are performed over the memory locations of the window, and in each of which an additional read operation and corresponding write operation are performed at each of one or more randomly-selected memory locations of the window.

13. The method of claim 9, wherein each memory location further stores a data authentication tag produced with a second key that changes with each write operation, the second key also changing from memory location to memory location, and
wherein performing the read operation includes verifying integrity of the ciphertext based on the data authentication tag and second key.

14. The method of claim 9, wherein the read operation at each memory location comprises:
reading the version value and block of ciphertext stored at the memory location having a respective address;
regenerating the key using the version value and respective address; and
decrypting the block of ciphertext with the regenerated key to produce plaintext corresponding to the block of ciphertext.

15. The method of claim 14, wherein the corresponding write operation at each memory location comprises:
updating the version value;
generating another key using the updated version value and respective address;
encrypting the plaintext with the generated key to reproduce the block of ciphertext; and
writing the updated version value and reproduced block of ciphertext at the memory location having the respective address.

16. The method of claim 9, wherein in at least one instance in which the validity of the block of ciphertext is not verified, the method further comprises:
performing one or more actions in accordance with one or more security policies.

* * * * *

UNITED STATES PATENT AND TRADEMARK OFFICE
CERTIFICATE OF CORRECTION

PATENT NO. : 9,928,385 B2
APPLICATION NO. : 14/472948
DATED : March 27, 2018
INVENTOR(S) : Laszlo Hars It is certified that error appears in the above-identified patent and that said Letters Patent is hereby corrected as shown below:

In the Claims

In Column 12, Line 46, Claim 2, "write operation randomly over the memory locations" should read -- write operation sequentially over the memory locations --

Signed and Sealed this
Twenty-ninth Day of May, 2018

Andrei Iancu
*Director of the United States Patent and Trademark Office*